United States Patent
Thucanakkenpalayam Sundararajan

(10) Patent No.: US 12,292,832 B2
(45) Date of Patent: May 6, 2025

(54) MEMORY COHERENCE PROTOCOL FOR COMMUNICATING DATA ASSOCIATED WITH A SHARED STATE BETWEEN PROCESSOR CORES

(71) Applicant: Synopsys, Inc., Mountain View, CA (US)

(72) Inventor: Karthik Thucanakkenpalayam Sundararajan, Fremont, CA (US)

(73) Assignee: Synopsys, Inc., Sunnyvale, CA (US)

( * ) Notice: Subject to any disclaimer, the term of this patent is extended or adjusted under 35 U.S.C. 154(b) by 83 days.

(21) Appl. No.: 17/974,881

(22) Filed: Oct. 27, 2022

(65) Prior Publication Data
US 2024/0143506 A1 May 2, 2024

(51) Int. Cl.
*G06F 12/0817* (2016.01)
*G06F 3/06* (2006.01)

(52) U.S. Cl.
CPC ........ *G06F 12/0828* (2013.01); *G06F 3/0611* (2013.01); *G06F 3/0653* (2013.01); *G06F 3/0659* (2013.01); *G06F 3/0673* (2013.01); *G06F 2212/621* (2013.01)

(58) Field of Classification Search
CPC .. G06F 12/0828; G06F 3/0611; G06F 3/0653; G06F 3/0659; G06F 3/0673; G06F 2212/621
See application file for complete search history.

(56) References Cited

U.S. PATENT DOCUMENTS

| | | | | |
|---|---|---|---|---|
| 5,848,434 | A * | 12/1998 | Young | G06F 12/0826 711/144 |
| 7,543,112 | B1 * | 6/2009 | Chou | G06F 12/0897 711/118 |
| 10,031,848 | B2 * | 7/2018 | Sistla | G06F 12/0831 |
| 2005/0154831 | A1 * | 7/2005 | Steely, Jr. | G06F 12/084 711/E12.024 |
| 2005/0160235 | A1 * | 7/2005 | Steely, Jr. | G06F 12/0831 711/146 |
| 2014/0181833 | A1 * | 6/2014 | Bird | G06F 9/5077 718/105 |
| 2019/0303313 | A1 * | 10/2019 | Boenapalli | G06F 13/1668 |
| 2020/0195537 | A1 * | 6/2020 | English | H04L 47/70 |
| 2021/0200678 | A1 * | 7/2021 | Pal | G06F 12/0811 |

OTHER PUBLICATIONS

Van Eijndhoven, Jos, et al. "Cache-coherent heterogeneous multi-processing as basis for streaming applications." Dynamic and robust streaming in and between connected consumer-electronic devices (2005): 61-80. (Year: 2005).*

(Continued)

*Primary Examiner* — Nicholas J Simonetti
(74) *Attorney, Agent, or Firm* — Patterson + Sheridan, LLP

(57) ABSTRACT

A system and method service memory transaction requests by receiving a memory transaction request for a first memory line from a first processor core of processor cores of a processing system. A second processor core of the processor cores is determined to include the first memory line in a shared state. Data of the first memory line is communicated from the second processor core to the first processor core based on determining that the second processor core comprises the first memory line in a shared state.

20 Claims, 7 Drawing Sheets

(56) References Cited

OTHER PUBLICATIONS

Shan, Hongzhang, et al. "Thread-level parallelization and optimization of NWChem for the Intel MIC architecture." Proceedings of the Sixth International Workshop on Programming Models and Applications for Multicores and Manycores. 2015. (Year: 2015).*
Shield, John, Jean-Philippe Diguet, and Guy Gogniat. "Asymmetric cache coherency: Policy modifications to improve multicore performance." ACM Transactions on Reconfigurable Technology and Systems (TRETS) 5.3 (2012): 1-12. (Year: 2012).*

* cited by examiner

MEMORY COHERENCE PROTOCOL FOR COMMUNICATING DATA ASSOCIATED WITH A SHARED STATE BETWEEN PROCESSOR CORES

TECHNICAL FIELD

The present disclosure relates to servicing memory transaction requests from processor cores, and more particularly to sharing data between processor cores to service memory transaction requests, reducing transactions with a primary memory.

BACKGROUND

A processing system may include a processor having multiple processor cores. The processor cores interact with a shared cache memory, writing and reading data from the shared cache memory. A memory coherency manager circuit receives the memory transaction requests from the processor cores, and ensures that conflicts are not created when the processor cores are updating data of a memory line. For example, the memory coherency manager circuit controls transactions between the processor cores and the shared cache memory to ensure that only one of the processor cores is writing (e.g., updating) to a line within the shared cache memory at a time. Further, the memory coherency manager circuit services read requests with data from a cache memory of a processor core, or from data within the primary memory.

SUMMARY

In one or more examples, a method includes receiving a memory transaction request for a first memory line from a first processor core of processor cores of a processing system. The method further includes determining, by a processing device, that a second processor core of the processor cores comprises the first memory line in a shared state. Further, the method includes communicating data of the first memory line from the second processor core to the first processor core based on determining that the second processor core comprises the first memory line in a shared state.

In one example, a system comprises processor cores, and a memory coherency manager circuit coupled to the processor cores. The memory coherency manager circuit receives a memory transaction request for a first memory line from a first processor core of the processor cores of a processing system. The memory coherency manager circuit further determines that a second processor core of the processor cores comprises the first memory line in a shared state. Further, the memory coherency manager circuit communicates data of the first memory line from the second processor core to the first processor core based on determining that the second processor core comprises the first memory line in a shared state.

In one example, a memory coherency manager circuit receives a memory transaction request for a first memory line from a first processor core of processor cores of a processing system. Further, the memory coherency manager circuit determines that a second processor core of the processor cores comprises the first memory line in a shared state. The memory coherency manager further communicate data of the first memory line from the second processor core to the first processor core based on determining that the second processor core comprises the first memory line in a shared state.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
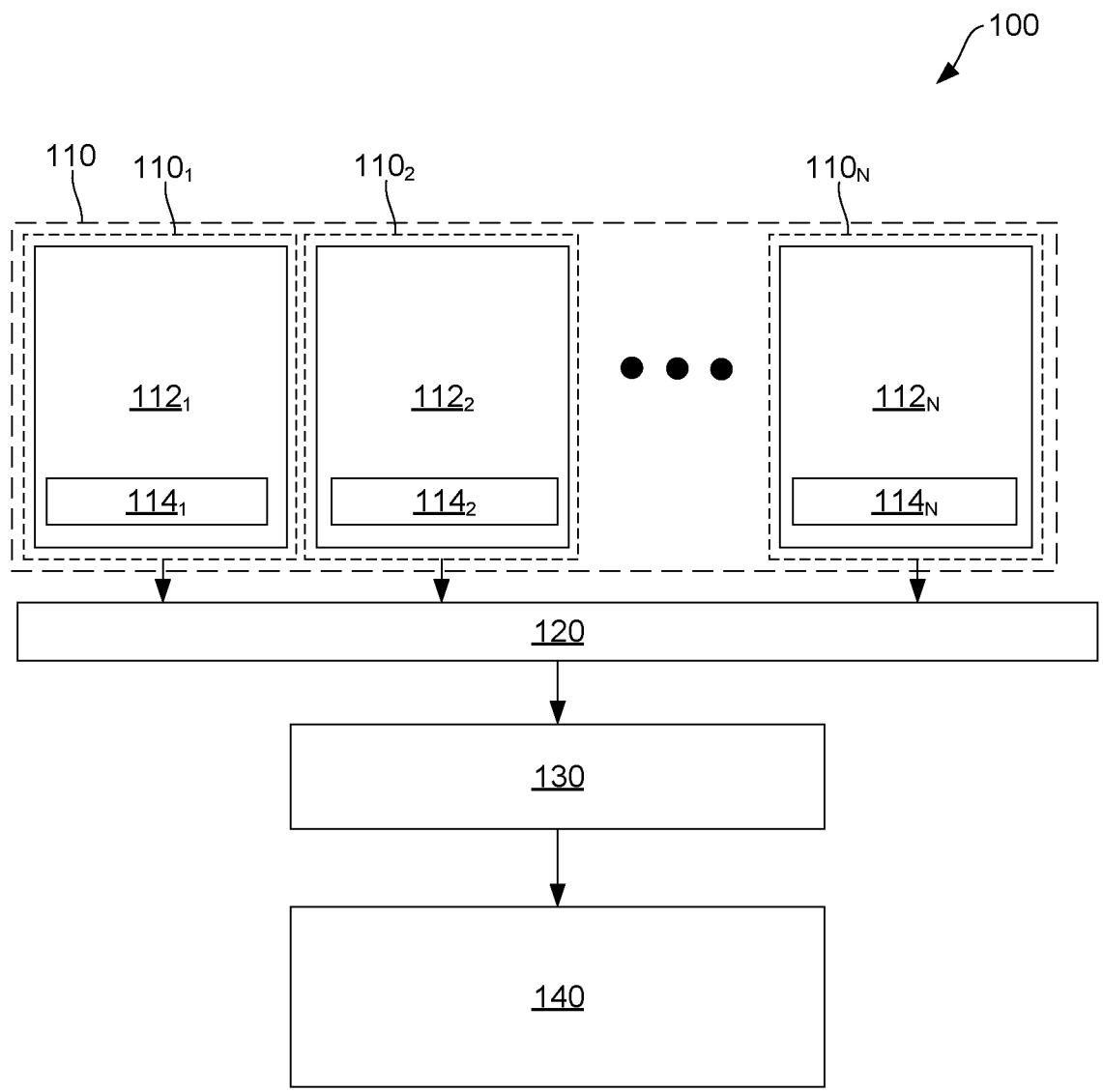
FIG. 1 illustrates block diagram of a processing system including processor cores and a memory coherency manager circuit.

Aspects of the present disclosure relate to a memory coherency protocol for communicating data associated with a shared state between processor cores.

Processing systems include a memory coherency manager circuit to control memory transaction requests of the processor cores of the processing system. In one example, the processor cores communicate memory transaction requests to the memory coherency manager circuit. The memory transaction requests may be read transactions (e.g., load transaction) and/or write transactions (e.g., store transactions). The memory coherency manager circuit receives the memory transaction requests and services the memory transaction requests based on the order in which the memory transaction requests are received. In one example when servicing a read transaction request for a first processor core, the memory coherency manager circuit attempts to obtain the memory line of the read transaction request from the other processor cores of the processor system. However, if none of the other processor cores have the memory line stored associated with a modified, owned, or exclusive state, the memory coherency manager circuit obtains the memory line from a shared primary memory.

As is described in greater detail in the following, each of the processor cores store memory lines within a respective local cache. The memory lines are associated with a state (e.g., modified, owned, exclusive, shared, or invalid). Processor cores that have a memory line associated with a modified state, owned state, or exclusive state are able to write to the particular memory line, updating the data of the memory line, and are tasks with updating the data of the corresponding memory line within the primary shared cache memory. When the memory coherency manager circuit receives a read transaction from a first processor core, the memory coherency manager circuit determines if the memory line of the read transaction is being stored by another processor core with a modified, owned, or exclusive state. If a second processor core is deterred to be storing the memory line with a modified, owned, or exclusive state, the memory coherency manager circuit obtains the corresponding data from the second processor core and provides the data to the first processor core. In an instance where the second processor core evicts the memory line, no processor cores will be have the memory line with a modified, owned, or exclusive state, and the memory coherency manager circuit requests the data from a primary shared cache memory. However, the memory line may be stored by third processor core in a shared state. Accordingly, instead of requesting the memory line from a primary shared cache memory, the memory line is requested from the processor core that has the memory line in a shared state, reducing the latency in obtaining the memory line caused by accessing the primary shared cache memory, improving the performance of the corresponding processing system.

The present disclosure describes a circuit and a method for detecting memory lines stored within the cache memories of the processor cores and associated with a shared state when no cache memories of the processor cores have the memory line with a modified, owned, or exclusive state. As is described in further detail herein, the processor cores having the memory line associated with a shared state are instructed to communicate the corresponding memory line to requesting processor core. Technical advantages of the present disclosure include, but are not limited to, reducing the number of memory transaction requests communicated to a primary shared cache memory by detecting memory lines associated with a shared state by a processor core, and using such memory lines to service the memory transaction requests of the processor cores. Accordingly, the number of memory transaction requests communicated to a primary shared cache memory are reduced. Further, latency that may occur when servicing the memory transaction requests is reduced, and the performance of the corresponding processing system is improved.

FIG. 1 illustrates a schematic block diagram of a processing system 100, according to one or more examples. The processing system 100 may be configured similar to the computer system 700 of FIG. 7. In one example, the processing system 100 includes processor cores 110, an interconnect 120, a memory coherency manager circuit 130, and a memory 140. In one example, each of the processor cores 110 are connected to the memory coherency manager circuit 130 via the interconnect 120. Further, the memory coherency manager circuit 130 is connected to the memory 140.

The processing system 100 includes one or more integrated circuit (IC) chips. In one example, the processing system 100 includes one or more field programmable gate arrays (FPGAs) and/or application specific ICs (ASICS), among others. In one example, the processing system 100 is a system on chip (SoC). In one example, the processor cores 110, the interconnect 120, the memory coherency manager circuit 130, and the memory 140 are included within a common package. In another example, one or more of the interconnect 120, the memory coherency manager circuit 130, and the memory 140 is included within a package separate from that of the processor cores 110.

The processor cores 110 includes one or more processor cores (e.g., the processor cores $110_1$-$110_N$, where N is greater than one). Each of the processor cores 110 include a processor 112, which includes a cache memory 114. In one example, the processor 112 is a central processing unit (CPU). In another example, the processor 112 is a 32-bit or a 64-bit reduced instruction set computer (RISC) processor. In other examples, other types of processors may be used. For example, the processor 112 may be a digital signal processor (DSP). In one or more examples, the processor 112 may be configured similar to the processing device 702 of FIG. 7.

The cache memories 114 are one or more of instruction cache memories and data cache memories. The cache memories 114 may be a level one cache (e.g., primary cache or processor cache) memories that are part of a respective one of the processors 112. In another example, the each of the cache memories 114 are external from the processors 112, and coupled to a respective one of the processors 112. Each of the cache memories 114 has a size of one or bytes. In one example, each of the cache memories 114 has a size of 16 kilobytes (KB), 32 KB, 64 KB, or more.

In one example, each of the cache memories 114 stores data accessed from the memory 140 by a respective one of the processors 112. The data is stored within memory lines within the cache memories 114.

The processor cores 110 are connected to an interconnect 120. The interconnect 120 may be a communication bus, or other logic circuitry that is able to communicate data from the processor cores 110 to the memory coherency manager circuit 130 and the memory 140.

The interconnect 120 connects the processor cores 110 to the memory coherency manager circuit 130. The memory coherency manager circuit 130 provides input/output coherency between the memory 140 and the processor cores 110. In one or more examples, the memory coherency manager circuit 130 ensures the consistency of shared data between the cache memories 114 and the memory 140. In one example, the memory coherency manager circuit 130 ensures that data associated with an address of the memory 140 in each of the cache memories 114 has the same value. For example, when a first processor 112 modifies data of an address within the memory 140, the memory coherency manager circuit 130 communicates the modified data to each of the other processors 112 before the other processors 112 further modified the modified data. Further, the memory coherency manager circuit 130 ensures that as processors 112 execute store instructions (e.g., a write command) to the memory 140, the data stored in each of the cache memories 114 remains valid (e.g., includes the most recent changes). The memory coherency manager circuit 130 further controls communication between processor cores 110 to respond to read requests made by the processor cores 110. In one example, the memory coherency manager circuit 130 obtains receives a read request from a first one of the processor cores 110 and requests that a second one of the processor core 110 provides the data.

The memory 140 is a memory that is shared among the processor cores 110 via the interconnect 120, and the memory coherency manager circuit 130. In one example, the memory 140 is a cache memory. For example, the memory 140 is a level two cache memory. The memory 140 may be referred to as an external cache or a secondary cache. The memory 140 is larger than the cache memories 114. In one example, the memory 140 has a size of 16 KB, 32 KB, 64 KB, or more.

In one example, in each of the memories 114 the stored memory are associated with a state of a protocol. The protocol may be a MOESI protocol. A MOESI protocol includes a modified state, an owned state, an exclusive state, a shared state, and an invalid state. A modified state corresponds to a memory line that has been changed. An owned state corresponds to a state where the corresponding cache memory 114 includes a valid copy of the cache line, and has exclusive rights to make modifications to the memory line. In an owned state, other cache memories 114 may have a copy of the memory line, but the other cache memories 114 are not able to modify the memory line. In one example, the cache memory 114 that is the owner of a memory line (e.g., has a memory line associated with owner state) makes changes to the corresponding memory line within the memory 140.

A cache memory 114 having a memory line associated with an exclusive state has the only copy of the memory line, and the memory line is unmodified (e.g., clean) from the corresponding memory line within the memory 140. A memory line is associated with a shared state when the memory line or memory lines is stored within multiple cache memories 114. A memory line associated with a shared state within one or more processor cores 110 may be associated with a modified state, an owned state, or an exclusive state within another processor core 110. A memory line associated with an invalid state is an invalid memory line.

Figure 2:
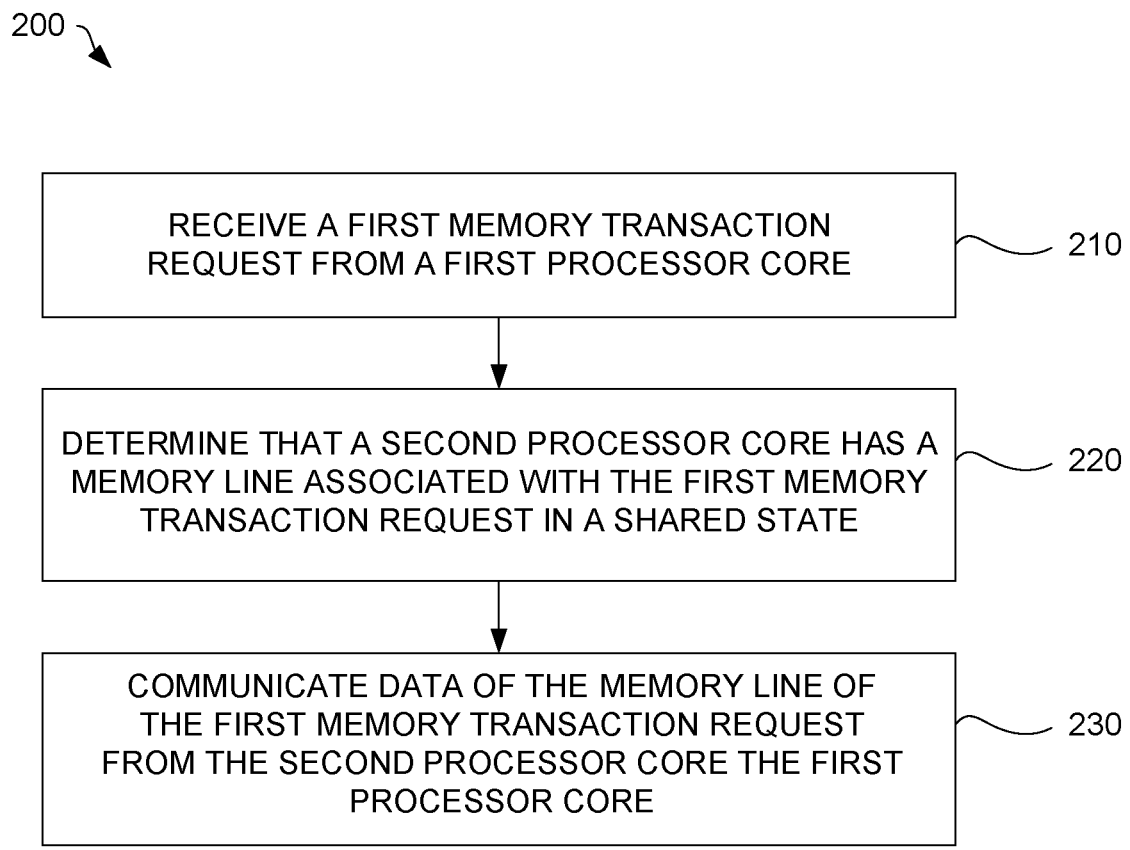
FIG. 2 depicts a flowchart of a method for servicing memory transaction requests of processor cores by a memory coherency manager circuit.
Figure 5:
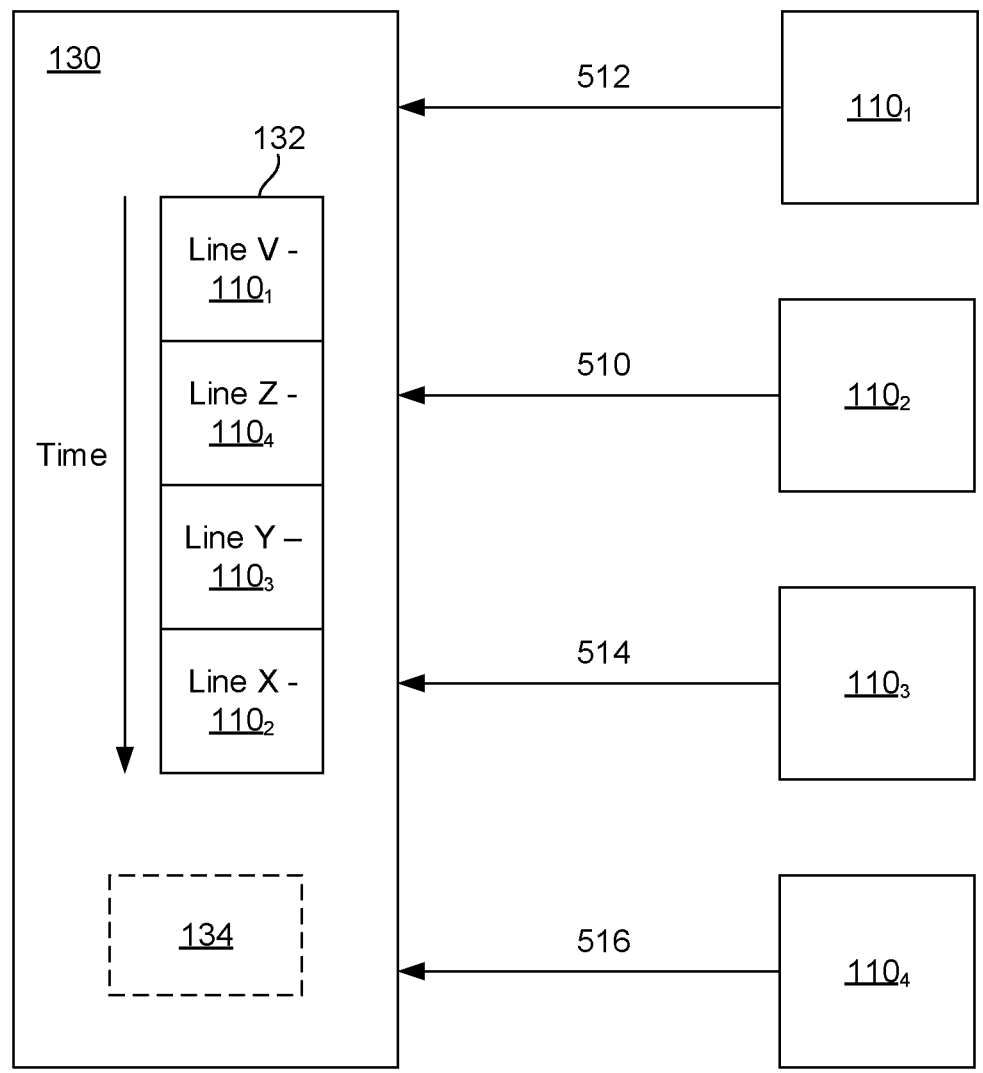
FIG. 5 illustrates a block diagram of a memory coherency circuit receiving memory transaction requests from processor cores.

FIG. 2 illustrates a flowchart of a method 200 for servicing memory transaction requests of processor cores. In one example, the method 200 is performed by the memory coherency manager circuit 130 of FIG. 1. At 210 of the method 200, a first memory transaction is received from a first processor core. For example, with reference to FIG. 1, the memory coherency manager circuit 130 receives a memory transaction request from one or more of the processor cores 110 via the interconnect 120. With reference to FIG. 5, the memory coherency manager circuit 130 receives the memory transaction request 510 from the processor core 110$_2$. The memory transaction request 510 is a read request. Further, the memory coherency manager circuit 130 receives the memory transaction request 512 from the processor core 110$_1$, the memory transaction request 514 from the processor core 110$_3$, and the memory transaction request 516 from the processor core 110$_4$. In one example, the memory coherency manager circuit 130 orders the memory transaction requests in the order that the memory transaction requests 510-516 are received. The memory coherency manager circuit 130 stores the memory transaction requests 510-516 within the buffer 132 of FIG. 5. The memory line of each memory transaction request 510-516 is stored within the buffer 132. For example, the memory transaction request 512 has a target memory line as Line V, and as the memory transaction request 512 is received before the other memory transaction requests 510, and 514-516, the Line V is stored first within the buffer 132. The memory lines Line Z, Line Y, and Line X are stored within the buffer 132 based on the order that the memory transaction requests 510, and 514-516 are received by the memory coherency manager circuit 130.

The memory coherency manager circuit 130 services the memory transaction requests 510-516 based on the order that the memory transaction requests are received, and the order within the buffer 132. In one example, each of the memory transaction requests 512-516 are serviced before the memory transaction request 510, as the memory transaction request 510 is received after the memory transaction requests 512-516 are received. Servicing a memory transaction requests includes allowing a processor core 110 to write data to specified memory line (e.g., memory address) and/or read data from a specified memory line.

At 220 of the method 200, a second processor core is determined to have a memory line associated with the first memory transaction request in a shared state. In one example, the memory transaction request 510 is a read request for the Line X. Accordingly, when servicing the memory transaction request 510 of the processor core 110$_2$, the memory coherency manager circuit 130 determines that none of the other processor cores 110 contain (e.g., the respective cache memories 114 do not contain) the Line X of the memory transaction request 510 in a modified, owned, or exclusive state. However, the memory coherency manager circuit 130 determines that the processor cores 110$_3$ and 110$_4$ contain (e.g., the respective cache memories 114$_3$ and 114$_4$ contain) Line X in a shared state. Thus, instead of requesting the data of Line X from the memory 140, the memory coherency manager circuit 130 instructs the processor core 110$_3$ or the processor core 110$_4$ to provide the data associated with Line X to the processor core 110$_2$. For example, at 230 of the method 200, data associated with the first memory line is communicated from the second processor core to the second processor core. The data is communicated based on determining that the second processor core contains data corresponding to the memory line in a shared state, and that no other processor cores has the data corresponding to the memory line in a modified, owned, or exclusive state. In one example, the memory coherency manager circuit 130 instructs the processor core 110$_3$ to communicate the data associated with Line X of the memory transaction request 510 to the processor core 110$_2$. The memory coherency manager circuit 130 may request that the processor core 110$_3$ provides the data to the memory coherency manager circuit 130, and the memory coherency manager circuit 130 communicates the data to the processor core 110$_2$. The processor core 110$_2$ maintains the received data in a shared state. Communicating data that is associated with a shared state, but is not associated with a modified, owned, or exclusive state, reduces the number of times a shared primary memory (e.g., the memory 140) is accessed, reducing latency in servicing memory transaction requests and improving the performance of the corresponding processing system.

Figure 3:
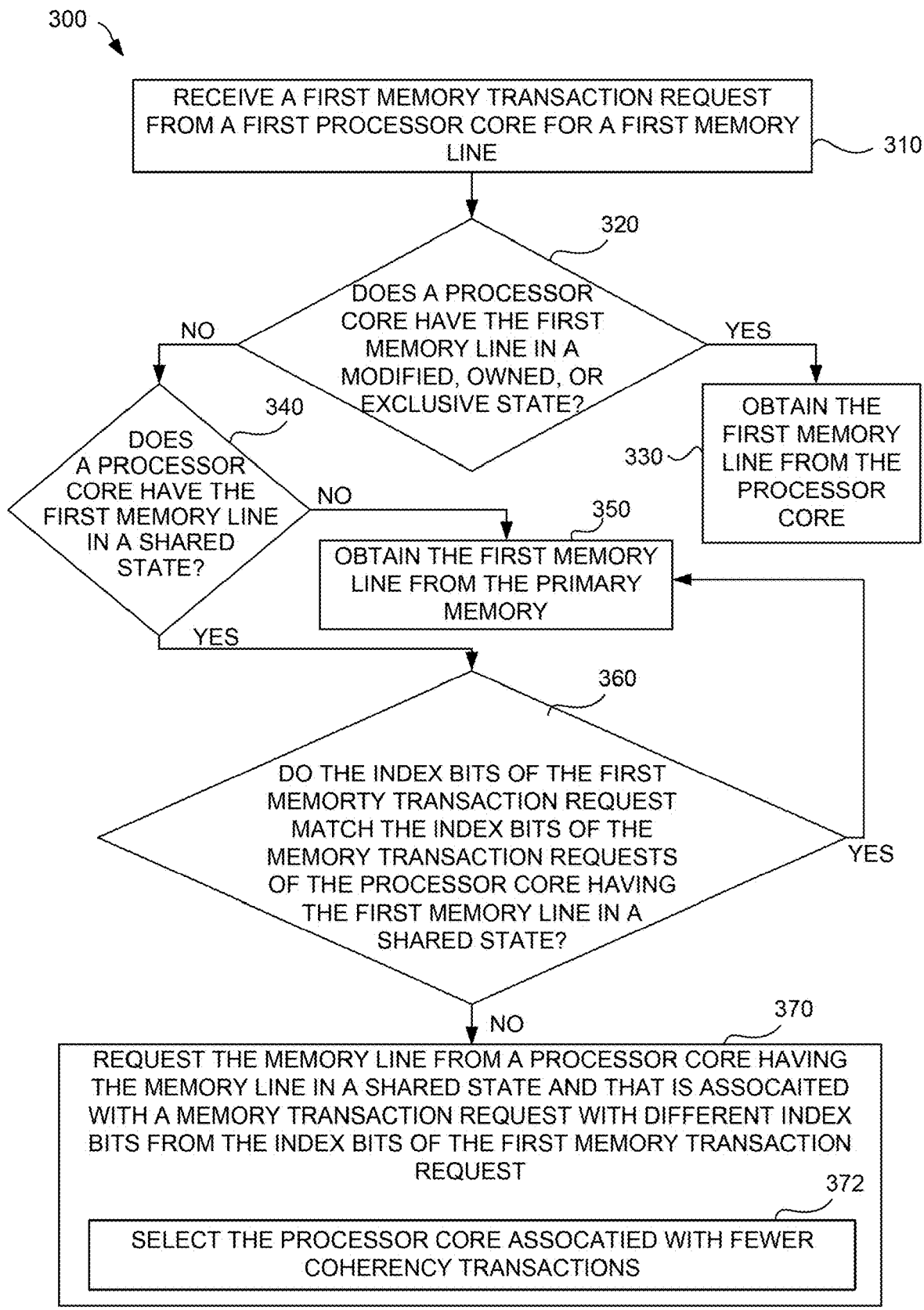
FIG. 3 depicts a flowchart of a method for servicing memory transaction requests of processor cores by a memory coherency manager circuit.

In one or more examples, the memory coherency manager circuit 130 maintains a directory of shadow copies of the contents of the tag bits of the processor cores 110 along with a corresponding state. For example, each memory line stored within the cache memory 114 of each processor core 110 includes metadata including tag bits (or a tag field). The tag bits are the higher-order bits of the address of the data. In other examples, other bits of the address may be used as the tag bits. The tag bits function as a prefix for the data stored in the corresponding memory line within a memory. The tag bits allow for a memory line to track wherein the primary memory the data came from, as the tag bits indicate which subset of the primary memory is stored within the memory line. The memory coherency manager circuit 130 uses the shadow copies of the tag bits to determine which of the processor cores 110 has the data of a memory transaction request in a modified state, owned state, exclusive state, shared state, or invalid state. FIG. 3 illustrates a flowchart of a method 300 further describing how a memory coherency manager circuit, which contains a directory of shadow copies of the contents of the tag bits of the processor cores, services memory transaction requests.

At 310 of the method 300, a first memory transaction request is received from a first processor core for a first memory line. 310 of the method 300 corresponds to 210 of the method 200. For example, with reference to FIG. 5, the memory coherency manager circuit 130 receives the memory transaction request 510 from the processor core $110_2$, the memory transaction request 512 from the processor core $110_1$, the memory transaction request 514 from the processor core $110_3$, and the memory transaction request 516 from the processor core $110_4$. The memory transaction request 510 is a read request and is associated with the Line X.

At 320 of the method 300, a determination as to whether or not a processor core has the first memory line in a modified, owned, or exclusive state is made. For example, with reference to FIG. 5, the memory coherency manager circuit 130 determines whether or not one or more of the processor cores $110_1$, $110_3$, and $110_4$ have the Line X in a modified, owned, or exclusive state. The memory coherency manager circuit 130 accesses the directory 134 of tag bits to determine whether or not one or more of the processor cores $110_1$, $110_3$, and $110_4$ have the Line X in a modified, owned, or exclusive state. A memory transaction request (e.g., the memory transaction request 510-516) includes tag bits, index bits, and offset bits. The tag bits are described above, and indicate the target memory line of a memory transaction request. The tag bits include one or more bits of a memory transaction request. The index bits indicate the target set (e.g., row) of memory lines of a memory transaction request. The memory lines of a cache memory (e.g., the cache memory 114) may be grouped into sets, each set comprising a two or more memory lines. The index bits are used to identify which set is associated with the memory transaction request. The index bits includes one or more bits. The offset bits identify the bits within a memory line that are associated with the requested data of the memory transaction request. The offset bits include one or more bits.

The memory coherency manager circuit 130 compares the tag bits of the memory transaction request 510 to the tag bits within the directory 134 to determine whether or not one or more of the processor cores $110_1$, $110_3$, and $110_4$ have the corresponding memory line in a modified state, owned state, or exclusive state. In one example, based on determining that one or more processor cores has the first memory line in a modified state, owned state, or exclusive state, the first memory line is obtained from the identified processor core at 330 of the method 300. For example, at 320 of the method 300, the memory coherency manager circuit 130 identifies that the processor core $110_1$ has the Line X in a modified state, owned state, or exclusive state. In such an example, at 330 of the method 300, the memory coherency manager circuit 130 instructs the processor core $110_1$ to communicate (or forward) the Line X to the processor core $110_2$. In one example, the memory coherency manager circuit 130 requests the Line X from the processor core $110_1$, and communicates the Line X to the processor core $110_2$.

Based on a determination that no processor cores have the first memory line in a modified, owned, or exclusive state, at 340 of the method 300 a determination as to whether or not a processor core has the first memory line in a shared state is made. For example, with reference to FIG. 5, the memory coherency manager circuit 130 determines whether or not one or more of the processor cores $110_1$, $110_3$, and $110_4$ have the Line X in a shared state. The memory coherency manager circuit 130 accesses the directory 134 of tag bits to determine whether or not one or more of the processor cores $110_1$, $110_3$, and $110_4$ have the Line X in a shared state. The memory coherency manager circuit 130 compares the tag bits of the memory transaction request 510 to the tag bits within the directory 134 to determine whether or not one or more of the processor cores $110_1$, $110_3$, and $110_4$ have the corresponding memory line in a shared state.

In one example, based on determining that one or more processor cores does not have the first memory line in a shared state, the first memory line is obtained from a primary shared memory (e.g., the memory 140 of FIG. 1) at 350 of the method 300. For example, at 340 of the method 300, the memory coherency manager circuit 130 identifies that the processor core $110_1$, the processor core $110_3$, and the processor core $110_4$ do not have the Line X in a shared state. Accordingly, the memory coherency manager circuit 130 obtains the Line X from the memory 140 of FIG. 1. The memory coherency manager circuit 130 communicates the memory transaction request 510 to the memory 140 to obtain the data associated with the Line X.

In one example, based on determining that one or more processor cores does have the first memory line in a shared state, index matching of the memory transaction requests of the one or more processor cores and the first memory transaction request is performed at 360 of the method 300. For example, the memory coherency manager circuit 130 compares the index bits of each of the memory transaction requests that have the Line X in a shared state to the index bits of the Line X. In one example, the index bits of the memory transaction requests 510, 514 and 516 are the fourth and fifth bits of the corresponding addresses from the least significant bits (LSBs) of the addresses. If bits the fourth and fifth bits match between the memory transaction request 510 and the memory transaction request 514, and between the memory transaction request 510 and the memory transaction request 516, the method 300 proceeds to 350. The data associated with the memory line is obtained from the memory 140 based on the index bits matching at 360 of the method 300 to ensure that the other processor cores will not write over and/or evict the corresponding memory line before providing the corresponding memory line to the processor core $110_2$.

At 370 of the method 300, based on determining that a processor core is associated with a memory transaction requests having different index bits from the first memory transaction request, the memory line is requested from a processor core having the memory line in a shared state and that is associated with a memory transaction request with different index bits from the index bits of the memory transaction requests. For example, if at 360 of the method 300 the processor cores $110_3$ and $110_4$ are determined to have the Line X in a shared state, and the index bits of the memory transaction requests 514 and 516 differ from the index bits of the memory transaction request 510, the memory coherency manager circuit 130 requests the Line X from one of the processor cores $110_3$ and $110_4$. In one example, the memory coherency manager circuit 130 selects the processor core $110_3$ or the processor core 110 based on which one of the processor cores $110_3$ and $110_4$ has less coherency transactions (e.g., a fewer number of transactions with the memory coherency manager circuit 130) at 372 of the method 300. The memory coherency manager circuit 130 maintains historical data for each of the processor cores 110, and selects one of the processor cores $110_3$ and $110_4$ based on the processor core that has the fewer number of coherency transactions. In another example, 372 of the method 300 is omitted, and the memory coherency manager circuit 130 randomly selects between the processor core $110_3$ and the processor core $110_4$.

In one example, the processor core $110_3$ is selected, and the memory coherency manager circuit 130 outputs a request to the processor core $110_3$ for data corresponding to the Line X. The request instructs the processor core $110_3$ to communicate the data of the requested memory line (e.g., the Line X) to the memory coherency manager circuit 130. The processor core $110_3$ determines whether or not the data of the Line X is available. If the data is available, the processor core $110_3$ provides the data of the Line X to the memory coherency manager circuit 130. The memory coherency manager circuit 130 provides the data of the Line X to the processor core $110_2$ to service the memory transaction request 510. The processor core $110_2$ associates the Line X with a shared state. In one example, the processor core $110_3$ determines that the data of the Line X is not available, and outputs a null response to the memory coherency manager circuit 130. Based on receiving the null response, the method 300 returns to 310.

Figure 4:
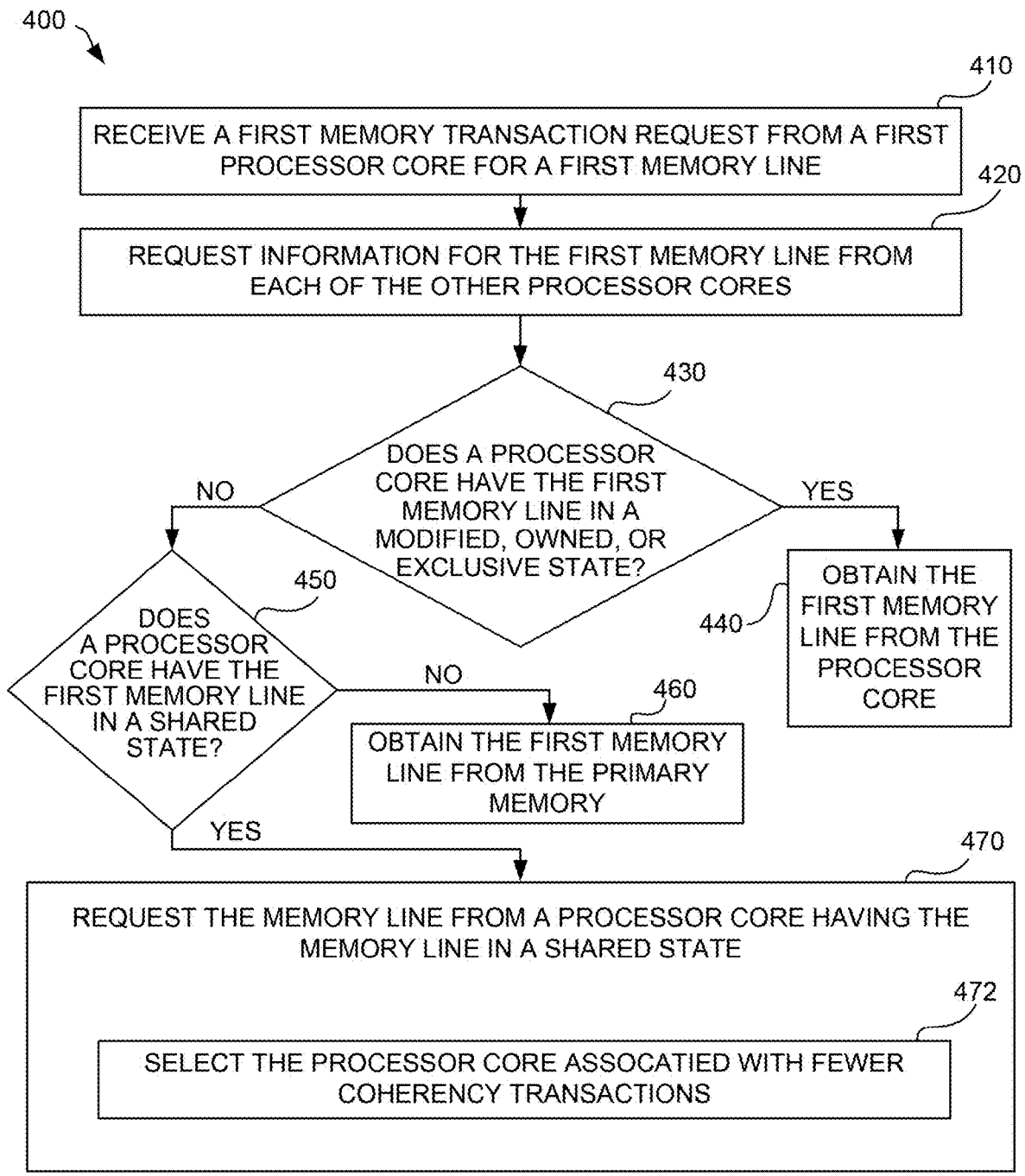
FIG. 4 depicts a flowchart of a method for servicing memory transaction requests of processor cores by a memory coherency manager circuit.

In one example, the memory coherency manager circuit 130 operates in a broadcast scheme (or snoop filter scheme). In a broadcast scheme, the memory coherency manager circuit 130 omits the directory 134. Further, in a broadcast scheme, the memory coherency manager circuit 130 broadcasts received requests from a first processor core to the other processor cores, to obtain the data of the requested memory lines. FIG. 4 illustrates a flowchart of a method 400 for servicing memory transaction requests with a memory coherency manager circuit 130 operating in a broadcast scheme.

At 410 of the method 400, a first memory transaction request is received from a first processor core for a first memory line. 410 of the method 400 corresponds to 210 of the method 200. For example, with reference to FIG. 6, the memory coherency manager circuit 130 receives the memory transaction request 510 from the processor core $110_2$, the memory transaction request 512 from the processor core $110_1$, the memory transaction request 514 from the processor core $110_3$, and the memory transaction request 516 from the processor core $110_4$. The memory transaction request 510 is a read request and is associated with the Line X.

Figure 6:
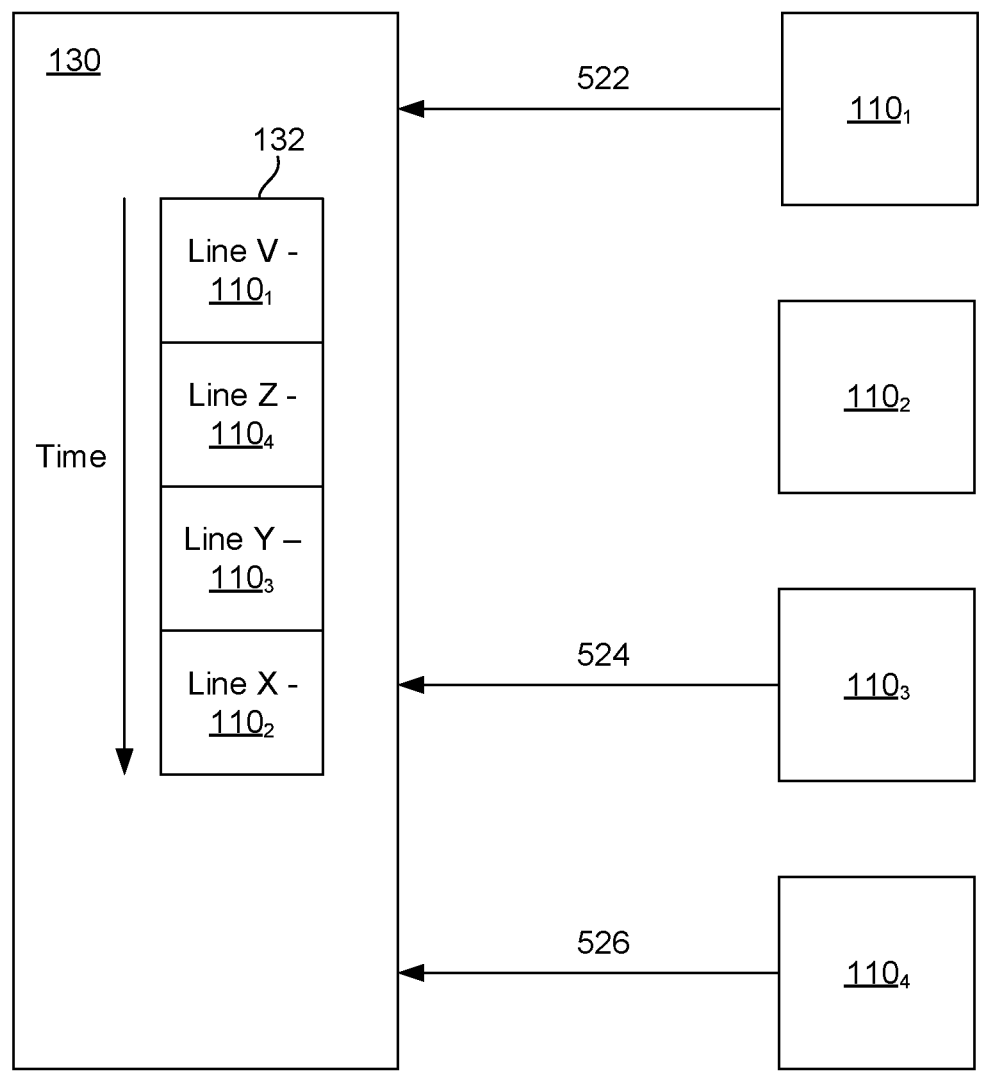
FIG. 6 illustrates a block diagram of a memory coherency circuit receiving responses regarding memory lines from processor cores.

At 420 of the method 400, information for the first memory line is requested from each of the other processor cores. For example, with reference to FIG. 5, the memory coherency manager circuit 130 requests information from the processor cores $110_1$, $110_3$, and $110_4$ for the Line X associated with the memory transaction request 510. As illustrated by FIG. 6, the memory coherency manager circuit 130 receives the responses 522, 524, and 526 from respective ones of the processor cores $110_1$, $110_3$ and $110_4$. The responses 522, 524, and 526 indicate whether or not the respective processor cores $110_1$, $110_3$ and $110_4$ include the Line X, and the associated state of the memory line.

At 430 of the method 400, a determination as to whether or not a processor core has the first memory line in a modified, owned, or exclusive state is made. For example, with reference to FIG. 6, the memory coherency manager circuit 130 determines whether or not one or more of the processor cores $110_1$, $110_3$, and $110_4$ have the Line X in a modified, owned, or exclusive state based on the responses 522-526. In one example, a response that indicates a processor core does not include the requested memory line is a null response. As the responses provide an indication as whether or not the respective processor core 110 includes the requested memory line and the state of the memory line, the memory coherency manager circuit 130 processes the responses 522-526 to determine which of the processor cores $110_1$, $110_3$, and $110_4$, if any, have the requested memory line, and if the memory line is associated with a modified, owned, or exclusive state.

In one example, at 430 of the method 400 the memory coherency manager circuit 130 identifies that the processor core $110_1$ has the Line X in a modified state, owned state, or exclusive state based on the response 522. In such an example, at 440 of the method 400, the memory coherency manager circuit 130 instructs the processor core $110_1$ to communicate the Line X to the processor core $110_2$. In one example, the memory coherency manager circuit 130 requests the Line X from the processor core $110_1$ and communicates the Line X to the processor core $110_2$.

Based on a determination that a processor core 110 does not have the first memory line (e.g., the Line X) in a modified, owned, or exclusive state, at 450 of the method 400, a determination as to whether or not a processor core has the first memory line in a shared state is made. For example, with reference to FIG. 6, the memory coherency manager circuit 130 determines whether or not one or more of the processor cores $110_1$, $110_3$, and $110_4$ have the Line X in a shared state based on the responses 522-526. The responses 522-526 provide an indication as whether or not the respective processor core 110 includes the requested memory line and the state of the memory line. The memory coherency manager circuit 130 processes the responses 522-526 to determine which of the processor cores $110_1$, $110_3$, and $110_4$, if any, have the requested memory line, and if the requested memory line is associated with a shared state. If no processor cores 110 are determined to have the requested memory line (e.g., the Line X), the method proceeds to 460, and the first memory line is obtained from a primary memory (e.g., the memory 140 of FIG. 1).

In one example, based on determining that one or more processor cores $110_1$, $110_3$, and $110_4$ does have the first memory line in a shared state based on the responses 522-526, the Line X is requested from a processor core having the memory line in a shared state at 470 of the method 300. For example, if at 450 of the method 400 the processor cores $110_3$ and $110_4$ are determined to have the Line X in a shared state based on the responses 524 and 526, the memory coherency manager circuit 130 requests the Line X from one of the processor cores $110_3$ and $110_4$. In one example, the memory coherency manager circuit 130 selects the processor core $110_3$ or the processor core 110 based on which one of the processor cores $110_3$ and $110_4$ has less coherency transactions at 472 of the method 400. 472 of the method 400 is configured similar to that of 372 of the method 300. In another example, 472 of the method 400 is omitted, and the memory coherency manager circuit 130 randomly selects between the processor core $110_3$ and the processor core $110_4$. The processor core $110_2$ receives the data associated with the Line X, stores the data and associates the memory line with a shared state.

In one example, if the selected processor core 110 determines that the data of the Line X is not available, and the processor core 110 outputs a null response to the memory coherency manager circuit 130. Based on receiving the null response, the method 400 returns to 410.

Figure 7:
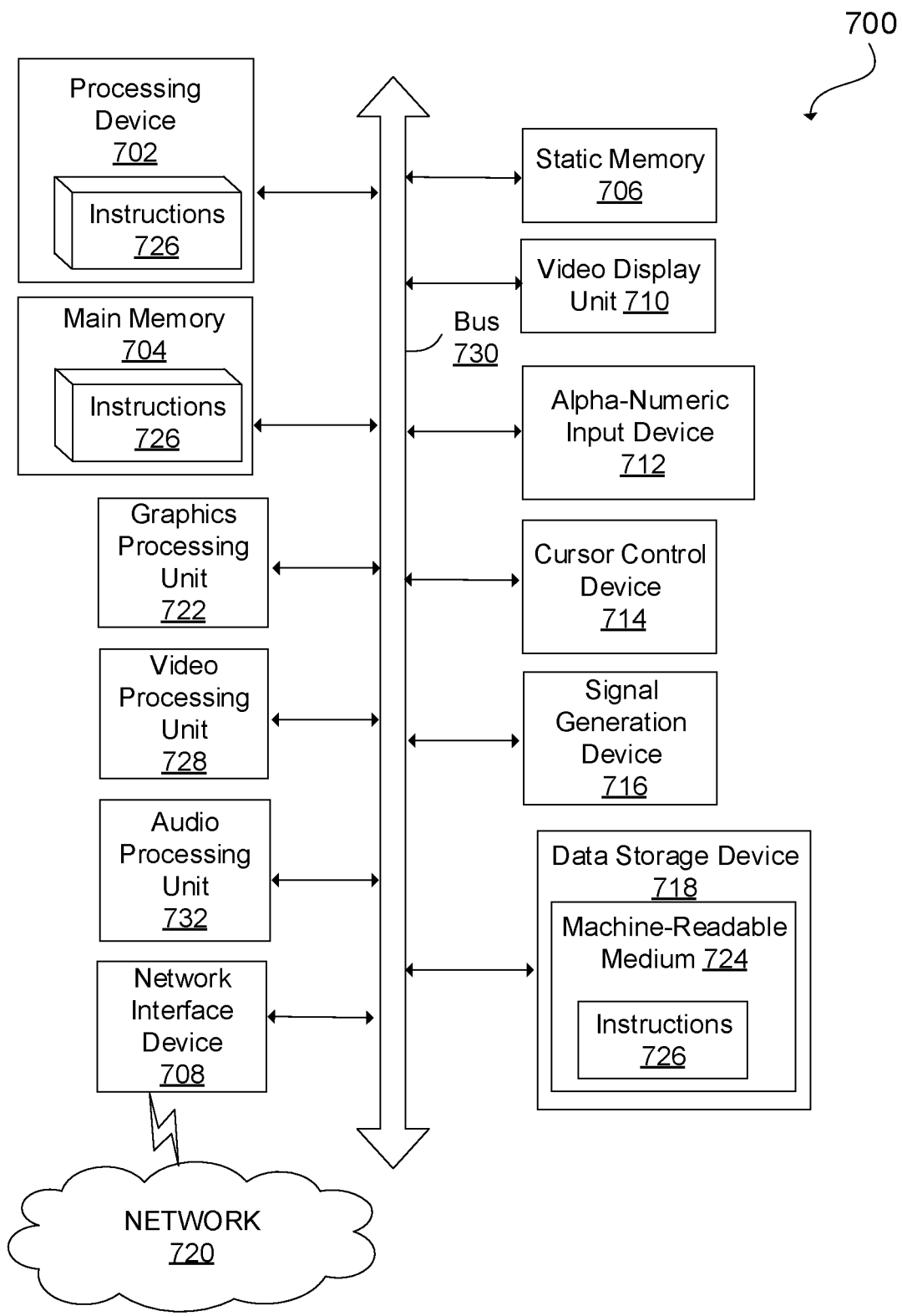
FIG. 7 depicts a diagram of an example computer system in which embodiments of the present disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed)

network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
receiving a first memory transaction request for a first memory line from a first processor core of processor cores of a processing system, wherein the processor cores comprise a second processor core and a third processor core;
determining, by a memory coherency manager circuit, that the second processor core comprises the first memory line in a shared state;
selecting, by the memory coherency manager circuit, the second processor core to provide the first memory line to the first processor core based on index bits of a second memory transaction request received from the second processor core differing from index bits of the first memory transaction request, and a first number of coherency transactions between the second processor core and the memory coherency manager circuit and a second number of coherency transactions between the third processor core and the memory coherency manager circuit; and
communicating data of the first memory line from the second processor core to the first processor core based on selecting the second processor core.

2. The method of claim 1 further comprising:
determining that the first memory line is not associated with an owned state, a modified state, or an exclusive state, and wherein the determination that the second processor core comprises the first memory line in the shared state is based the determination that the first memory line is not associated with the owned state, the modified state, or the exclusive state.

3. The method of claim 1, wherein the index bits of the second memory transaction request are associated with least significant bits of an address of the second memory transaction request.

4. The method of claim 1 further comprising determining that the third processor core comprises the first memory line in the shared state.

5. The method of claim 4, wherein selecting the second processor core is further based on determining that the first number of coherency transactions is less than the second number of coherency transactions.

6. The method of claim 1 further comprises broadcasting a request for information regarding the first memory line to the processor cores, and receiving responses from the processor cores.

7. The method of claim 6, wherein the second processor core is determined to comprise the first memory line in the shared state based on the responses received from the processor cores.

8. A system comprising:
processor cores comprising a first processor core, a second processor core, and a third processor core; and
a memory coherency manager circuit coupled to the processor cores and configured to:
receive a memory transaction request for a first memory line from the first processor core;
determine that the second processor core comprises the first memory line in a shared state;
select the second processor core to provide the first memory line to the first processor core based on index bits of a second memory transaction request received from the second processor core differing from index bits of the first memory transaction request, and a first number of coherency transactions between the second processor core and the memory coherency manager circuit and a second number of coherency transactions between the third processor core and the memory coherency manager circuit; and
communicate data of the first memory line from the second processor core to the first processor core based on selecting the second processor core.

9. The system of claim 8, wherein the memory coherency manager circuit is further configured to:
determine that the first memory line is not associated with an owned state, a modified state, or an exclusive state, and wherein the determination that the second processor core comprises the first memory line in the shared state is based the determination that the first memory line is not associated with the owned state, the modified state, or the exclusive state.

10. The system of claim 8, wherein the index bits of the second memory transaction request are associated with least significant bits of an address of the second memory transaction request.

11. The system of claim 8, wherein determining that the third processor core comprises the first memory line in the shared state.

12. The system of claim 11, wherein selecting the second processor core is further based on determining that the first number of coherency transactions is than the second number of coherency transactions.

13. The system of claim 8, wherein the memory coherency manager circuit is further configured to broadcast a request for information regarding the first memory line to the processor cores, and receiving responses from the processor cores.

14. The system of claim 13, wherein the second processor core is determined to comprise the first memory line in the shared state based on the responses received from the processor cores.

15. A memory coherency manager circuit configured to:
receive a memory transaction request for a first memory line from a first processor core of processor cores of a processing system, wherein the memory coherency manager circuit and the processor cores are disposed within one or more packages, and wherein the processor cores comprise a second processor core and a third processor core;
determine that the second processor core of the processor cores comprises the first memory line in a shared state;
select the second processor core to provide the first memory line to the first processor core based on index bits of a second memory transaction request received from the second processor core differing from index bits of the first memory transaction request, and a first number of coherency transactions between the second processor core and the memory coherency manager circuit and a second number of coherency transactions between the third processor core and the memory coherency manager circuit; and communicate data of the first memory line from the second processor core to the first processor core based on selecting the second processor core.

16. The memory coherency manager circuit of claim 15 further configured to:
determine that the first memory line is not associated with an owned state, a modified state, or an exclusive state, and wherein the determination that the second processor core comprises the first memory line in the shared state is based on the determination that the first memory line is not associated with the owned state, the modified state, or the exclusive state.

17. The memory coherency manager circuit of claim 15, wherein the index bits of the second memory transaction request are associated with least significant bits of an address of the second memory transaction request.

18. The memory coherency manager circuit of claim 15, wherein the memory coherency manager circuit is further configured to determine that the third processor core comprises the first memory line in the shared state.

19. The memory coherency manager circuit of claim 18, wherein selecting the second processor core is further based on determining that the the first number of coherency transactions is less than the second number of coherency transactions.

20. The memory coherency manager circuit of claim 15, wherein the memory coherency manager circuit is further configured to broadcast a request for information regarding the first memory line to the processor cores, and receiving responses from the processor cores, and wherein the second processor core is determined to comprise the first memory line in the shared state based on the responses.

* * * * *